United States Patent
Johnston et al.

(10) Patent No.: US 8,648,766 B2
(45) Date of Patent: Feb. 11, 2014

(54) DUAL CIRCULARLY POLARIZED ANTENNA

(71) Applicants: Ronald H. Johnston, Calgary (CA); Elise Fear, Calgary (CA)

(72) Inventors: Ronald H. Johnston, Calgary (CA); Elise Fear, Calgary (CA)

(73) Assignee: UTI Limited Partnership, Calgary, Alberta (CA)

(*) Notice: Subject to any disclaimer, the term of this patent is extended or adjusted under 35 U.S.C. 154(b) by 0 days.

(21) Appl. No.: 13/621,683

(22) Filed: Sep. 17, 2012

(65) Prior Publication Data
US 2013/0162473 A1    Jun. 27, 2013

Related U.S. Application Data

(62) Division of application No. 12/324,631, filed on Nov. 26, 2008, now Pat. No. 8,269,686.

(60) Provisional application No. 61/004,474, filed on Nov. 27, 2007.

(51) Int. Cl.
*H01Q 1/50* (2006.01)
*H04B 7/10* (2006.01)

(52) U.S. Cl.
USPC ............ 343/850; 343/700 MS; 343/797; 342/363; 342/375.61; 342/357.75

(58) Field of Classification Search
USPC ............ 343/700 MS, 850, 797; 342/363, 342/357.61, 357.75
See application file for complete search history.

(56) References Cited

U.S. PATENT DOCUMENTS 5,995,044 A * 11/1999 Kunysz et al. ............... 342/363

* cited by examiner

*Primary Examiner* — Dieu H Duong
(74) *Attorney, Agent, or Firm* — Fogarty, L.L.C.

(57) ABSTRACT

An antenna includes a waveguide having an aperture at a first end and a conducting component at a second end, the conducting component shorting the waveguide and a first set of two orthogonal dipoles, fed in quadrature, the orthogonal dipoles located near the aperture of the waveguide operating close to its dominant mode cut off frequency.

17 Claims, 22 Drawing Sheets

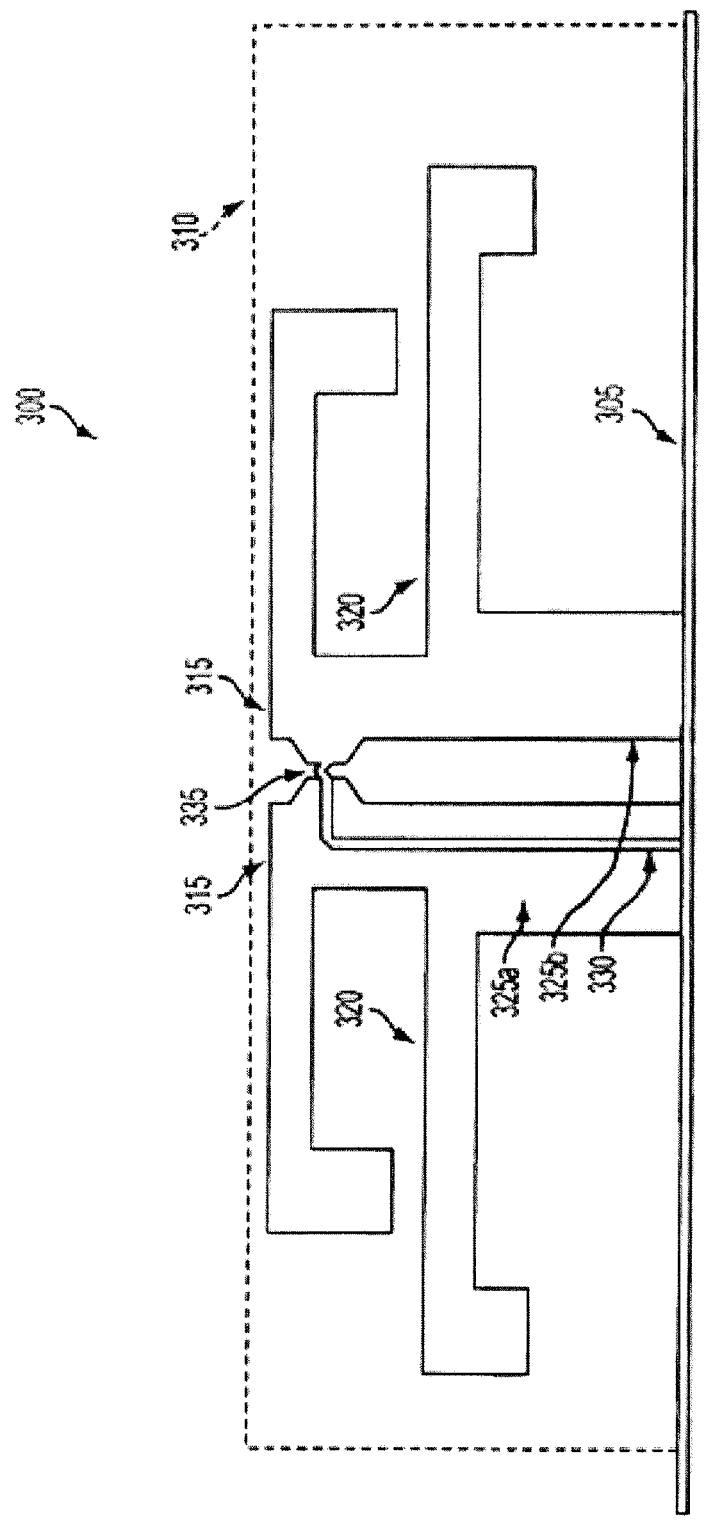

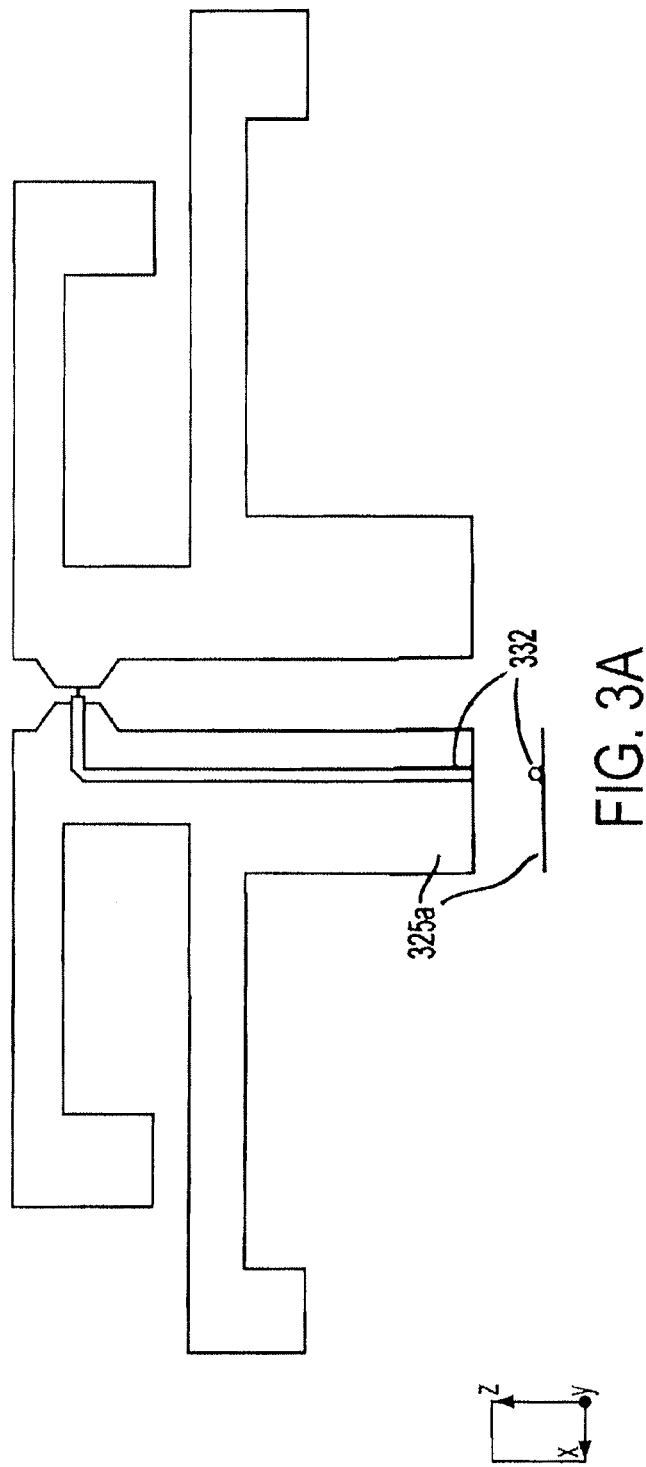

DUAL CIRCULARLY POLARIZED ANTENNA

PRIORITY

This application is a divisional of U.S. patent application Ser. No. 12/324,631 filed Nov. 26, 2008, which claims priority under 35 U.S.C. §119(e) to U.S. Provisional Application No. 61/004,474 filed Nov. 27, 2007, the contents of which are incorporated herein by reference in their entirety.

FIELD

Embodiments of the invention relate generally to the field of antenna systems and more specifically to receiving antennas for satellite-based positioning systems.

BACKGROUND

Conventional satellite-based positioning systems, for example, a Global Navigation Satellite System (GNSS) such as the Global Positioning System (GPS) include a GPS receiver system. An important part of the receiving system is the antenna and non-ideal behavior of the antenna is one of the significant limitations in determining position with very high accuracy. Optimally, the antenna would receive only direct signals from the satellite with very high electrical phase stability regardless of the elevation and azimuth angles of the satellite. The antenna should have means for rejecting signals that have become corrupted by reflection, diffraction and/or refraction from physical structures in the vicinity of the path (or paths) of the signals arriving at the receiving antenna. The satellites transmit towards the earth with Right Hand Circular Polarization (RHCP). The best simple receiving antenna, used by a conventional GPS receiving system, will be responsive only to RHCP signals. The response of the antenna to Left Hand Circular Polarization (LHCP) should be many decibels down from that of the RHCP over a wide angular range. This type of antenna will be referred to as a High Purity Circularly Polarized (HPCP) antenna. A good high RHCP over LHCP response corresponds to a low axial ratio, which is the magnitude of the RHCP plus the magnitude of the LHCP all divided by the magnitude of the RHCP minus the magnitude of the LHCP for a given angular position in space when the antenna is exposed to a pure Linearly Polarized EM wave. An RHCP antenna should have a high ratio of RHCP over LHCP, which corresponds to a low axial ratio. A 20 dB RHCP to LHCP ratio corresponds to an axial ratio of 1.75 dB and a 24.8 dB RHCP to LHCP ratio corresponds to an axial ratio of 1.00 dB.

Many types of circularly polarized (CP) antennas are available for consideration. Some of the widely used CP antennas types include the CP microstrip patch, helical, spiral slot radiator, crossed electric dipoles (or turnstile), crossed slots, conical spirals antennas among others. The various antennas discussed above all have various shortcomings for achieving the desired high performance GPS antenna with two outputs, RHCP and LHCP. Microstrip patch antennas are likely to be too narrow band. Helical and spiral antennas can be built for RHCP or LHCP but not for both outputs simultaneously. The turnstile antenna can be built to deal with both of the above problems but it has a very poor axial ratio in the plane of the dipoles. In fact, it is difficult to obtain a good axial ratio over a wide angular range (over the upper hemisphere) with virtually any circularly polarized antenna.

The ideal GPS antenna will receive only RHCP signals from the upper hemisphere above the horizon. To address this capability, let us now consider the difficult problem of producing a HPCP signal over a large solid angle, that is the upper hemisphere. Assume that we have a turnstile antenna and the dipoles lie in a horizontal plane. In this case the turnstile antenna can produce HPCP at the zenith and at other high angles. But closer to the horizon the radiation will be more and more cross polarized, that is the RHCP over LHCP ratio will be lower and the axial ratio will be higher. In order that the overall antenna will produce HPCP in the horizontal plane it is necessary for that dipole to produce propagating field components at a given distance (R) on the Y-axis and of equal magnitude on the X-axis at a distance of R. The radiation gain patterns of $E_\phi$ and $E_\theta$ should approximate to a high degree of accuracy the trigonometric expressions, $\sin(2\phi)$ and $\cos(2\phi)$ respectively. The dipole as shown in FIG. 1A has a radiation null in the direction of X as shown in FIG. 1B. This means that the turnstile antenna will produce only a linearly (horizontal) polarized signal at the horizon. Various attempts to address this disadvantage have been undertaken. One proposed solution is to droop and sometimes bend the dipoles, which provides better circular polarization at the horizon but the best axial ratios at the horizon tend to be about 6 dB. Another method of promoting creation of fields off of the end of the active dipole is by the introduction of a cup or a closed end circular waveguide. For one such configuration, the axial ratio is reported to be better than 1 dB up to 28 degree off the axis of the antenna (i.e., the Z-axis). The electrical behavior of the cup (or closed end circular wave guide) is very strongly dependant on the operating frequency and the diameter of the cup. Also disclosed in the art is a full sized dipole and a cup diameter of about 1.2 free space wavelengths at the low end of the operating frequency band. This means that many circular waveguide modes may propagate into the cup to the short circuit and back out again. In general, it is not desirable to allow multiple modes to propagate in a well-structured EM device. These antennas have a moderately large bandwidth. Other prior art references disclose a dipole, shortened to an extreme degree, operating inside of the cup and none of the modes are propagating. For one such system, the antenna operating frequencies are 0.81 and 0.89 of the waveguide cutoff frequency. All modes are evanescent. This means that the signal power is very weakly coupled to the outside free space. This leads to a very narrow band operation of the antenna and it has led to a very unusual feeding structure for the dipoles. The unbalanced feed for each dipole can lead to poor purity of CP radiation. It also appears that this antenna is difficult to manufacture and to tune to the correct frequencies.

High precision GPS surveying and geographical locating systems have reached very high levels of precision and are approaching accuracies in the sub centimeter range under ideal conditions. In many locations however there are large numbers of scatterers that prevent high accuracy from being achieved. It is therefore desirable to have available methods of reducing the effects of these scatterers. The anticipated launching of a new system of satellites will give the ground station more signals that may be used to increase the number of valid data streams which will allow even better accuracy of determination of geographical location.

In high accuracy applications the mathematical processes utilized in the GPS receiver and subsequent digital processors, determine the number of wavelengths and the number of electrical degrees between that satellite and the GPS receiving antenna phase center. It is therefore important that the GPS antenna has a phase center that stays in the same location within very small tolerances as the reception angle of a given incoming wave changes from near the horizon to the zenith.

The phase center should also be independent of azimuth reception angle and be fairly independent of the frequency in use.

SUMMARY

Disclosed herein are embodiments of an antenna that includes a waveguide having an aperture at a first end and a conducting component at a second end, the conducting component shorting the waveguide and a first set of two orthogonal dipoles, fed in quadrature, the orthogonal dipoles located near the aperture of the waveguide operating close to its dominant mode cut off frequency.

BRIEF DESCRIPTION OF THE DRAWINGS

The invention may be best understood by referring to the following description and accompanying drawings that are used to illustrate embodiments of the invention. In the drawings:

FIG. 3 illustrates an antenna system implementing multiple sets of two orthogonal dipoles located at the aperture of a circular waveguide;

FIG. 3A shows the use of a miniature coaxial cables 332 bonded to the connecting plate 325a;

DETAILED DESCRIPTION

Figure 1A:
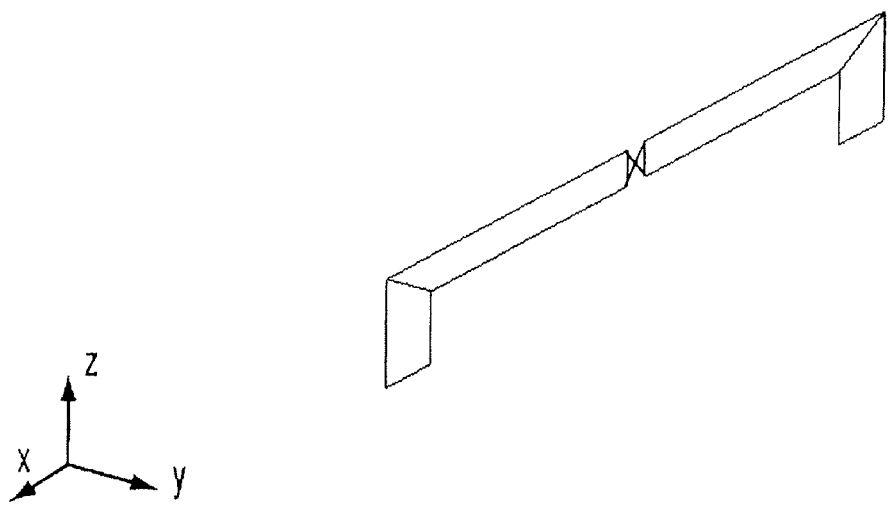
FIG. 1A illustrates a dipole antenna in accordance with the prior art.
Figure 1B:
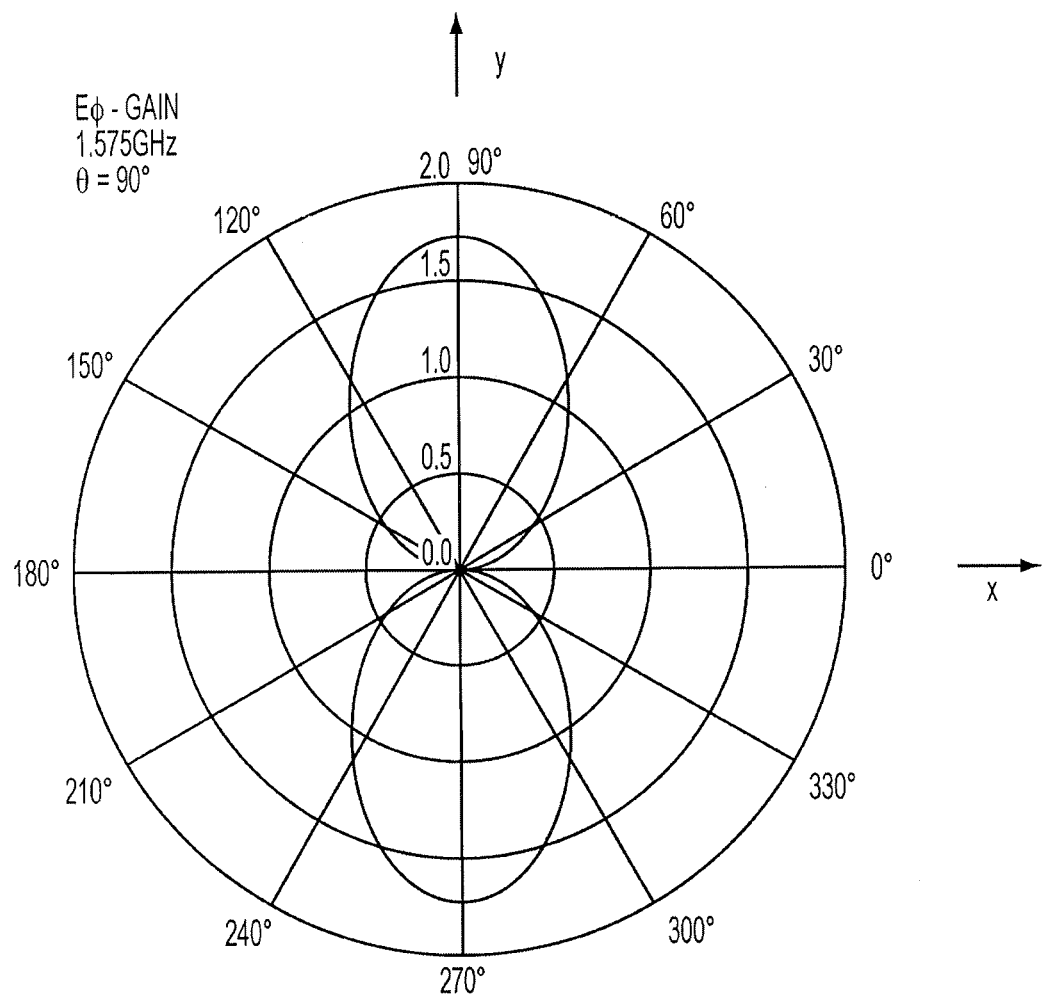
FIG. 1B illustrates, generally, the radiation gain pattern of the prior art dipole antenna shown in FIG. 1A in accordance with the prior art.

Disclosed herein are embodiments of a receiving antenna for delivering high purity circular polarization signal to one or two output ports. One embodiment includes an antenna comprising a set of two shortened orthogonal dipoles, fed in quadrature, located near the aperture of a circular waveguide operating close to its dominant mode cut off frequency. The far end of the waveguide is shorted by a connected conducting circular disk. For one such embodiment the antenna includes a second set of two orthogonal dipoles connected in parallel to the first set of dipoles to resonate and match at a second lower frequency band.

In the following description, numerous specific details are set forth. However, it is understood that embodiments of the invention may be practiced without these specific details. In other instances, well-known circuits, structures and techniques have not been shown in detail in order not to obscure the understanding of this description.

The appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

System Overview

In accordance with one example embodiment, the antenna has two output ports and very high purity output for a RHCP electromagnetic signal with substantially reduced LHCP EM signals on one output port. On the other output port, the output signal will be high purity output LHCP and substantially reduced RHCP EM signals. The antenna has a very stable phase center for signals that arrive from all locations in the upper hemisphere. The antenna is made of low loss structures with built in Low Noise Amplifiers so as to have minimum noise generation within the antenna. For one embodiment, the antenna covers the existing GPS and future European Galileo and Chinese Compass frequencies of 1176.45, 1207.14, 1227.60, 1278.75 and 1575.42 MHz with individual bandwidths of about 20.46 MHz. The antenna is inexpensive to manufacture and is based on printed circuit board and surface mount technologies as much as possible. The development of the antenna structure has depended at least in part on extensive electromagnetic computer simulations using a wire and plate method of moments known commercially as WIPL-D. This simulation contains optimization algorithms, which can be used to adjust antenna parameters for best performance. The simulation frequencies are rounded to 1175, 1205, 1225, 1275 and 1575 MHz and this will introduce negligible differences in the output performances. It is to be noted that antennas, without built-in amplifiers, are reciprocal devices and their properties remain the same whether they are transmitting or receiving.

One embodiment includes crossed dipoles located at the end face of a circular waveguide with the far end closed. The antenna can be built to receive two or more discontinuous frequency bands. For one embodiment, the antenna receives two bands that are approximately 1165 to 1290 MHz and 1565 to 1586 MHz, respectively. Due to the desirability of having a substantially constant phase center, the circular waveguide radius is made as small as practical while still operable over the desired frequency bands for one embodiment. That is, if the radius is made too small it will not be possible to make the antenna radiate (or receive radiation) over the desired frequency bands. In general, one would expect that the upper frequency band will radiate sufficiently due to operating further away from the cutoff frequency of the waveguide and because a reduced bandwidth is required. For one embodiment, a total of four dipoles (i.e., two sets of orthogonal dipoles) is placed in the circular waveguide. A first set of two orthogonal dipoles is tuned to 1225 GHz and other close by frequencies and will separated spatially from each other by 90 degrees to give circular polarization, while a second set of two orthogonal dipoles is tuned to approximately 1575 MHz and also separated spatially by 90 degrees. The two sets of dipoles interact electrically and alter the resonant frequency of each other and this must be accounted for in the construction of the overall structure. It has been found that shortened (and hence reduced bandwidth) dipoles interact less than full-length dipoles for a given fractional frequency separation. The dipoles for each frequency band are connected in parallel for a single feed for the X directed dipoles and another single feed for the Y directed dipoles. The two feeds pass via a transmission line and other possible transmission structures to a 90-degree hybrid, which has an output for the RHCP signal and an output for the LHCP signal.

Figure 2A:
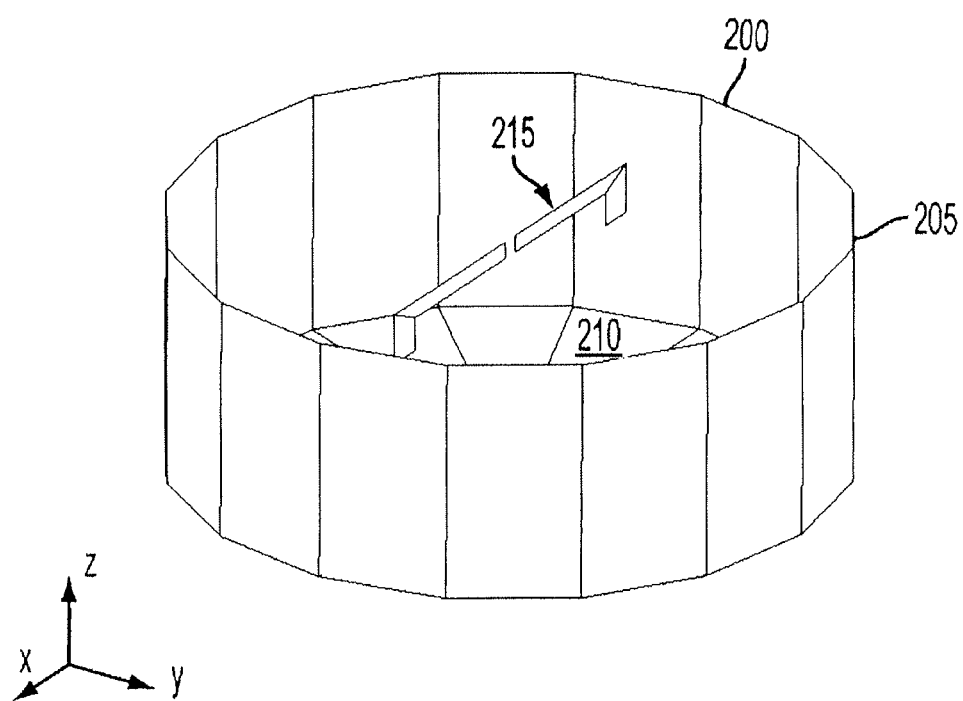
FIG. 2A illustrates an embodiment of an antenna system.
Figure 2B:
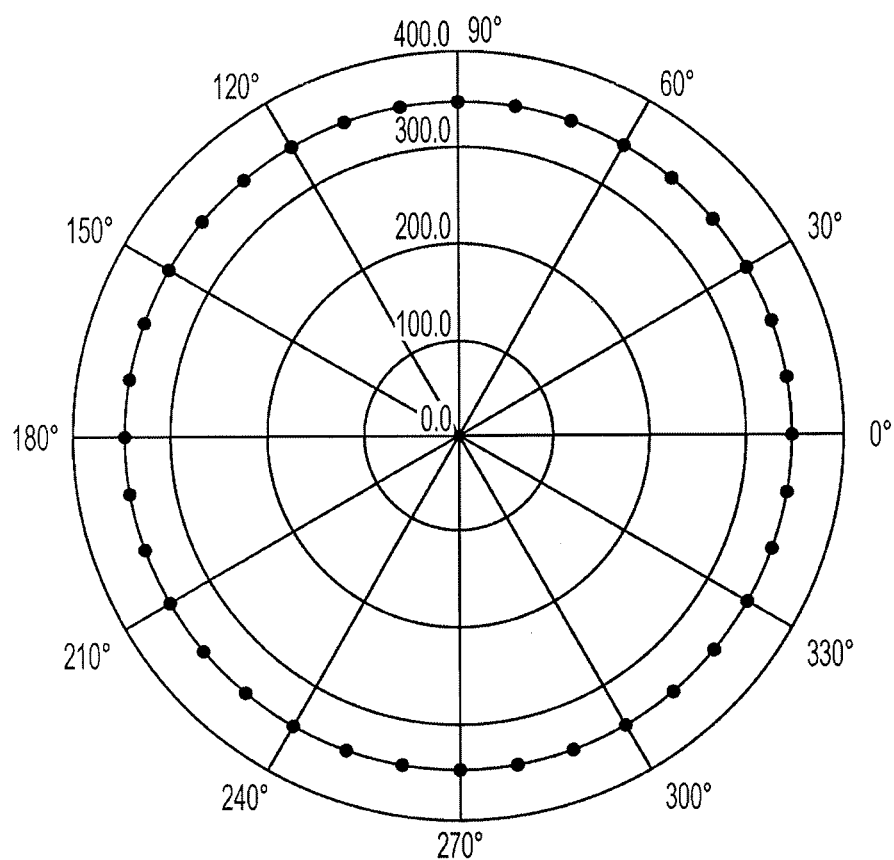
FIG. 2B illustrates the radiation gain pattern at the horizon of the antenna system 200, shown in FIG. 2A.

As mentioned above, the prior art turnstile type antenna can provide high purity RHCP at the zenith when the dipoles are laid in a horizontal plane. However, as noted above, as consideration is given to the radiation directed to the horizon, it becomes evident that a great departure from RHCP occurs as horizontal dipoles cannot produce an $E_\theta$ field component at the horizon. This is the minimum elevation angle that is appropriate for GPS usage and it is the most difficult angle at which to produce high purity RHCP. Therefore, such antennas may employ a circular waveguide, with one end shorted and the other end open, placed near or around the dipole. FIG. 2A illustrates an antenna system in accordance with one embodiment disclosed herein. Antenna system 200, shown in FIG. 2A includes a circular waveguide 205, a waveguide short 210, and a shortened dipole 215. FIG. 2B illustrates the radiation gain pattern of the antenna system 200 of FIG. 2A. As shown in FIG. 2A, the antenna system provides an almost perfectly circular radiation gain pattern, which will have both $E_\phi$ and $E_\theta$ field components of equal peak amplitudes.

The placement of a shortened dipole in a circular waveguide with the lower end shorted causes a reduced impedance bandwidth that will not allow good matching over the full range of the GPS frequencies. Therefore, a second dipole can be attached in parallel at the feed points and this dipole will be tuned to the lower band of frequencies. For one embodiment, this dipole is about 0.45 free space wavelengths long and together the dual dipoles resonate at 1225 and 1575 MHz, respectively, with enough bandwidth to operate satisfactorily at desired frequencies. FIG. 3 illustrates an antenna system implementing multiple sets of two orthogonal dipoles located at the aperture of a circular waveguide. Antenna system 300, shown in FIG. 3, includes multiple sets of orthogonal dipoles, shown for example as orthogonal dipoles sets 315 and 320. For one embodiment, the dipoles 315 and 320 are placed on a low loss printed circuit board 310. The input resistance at the 1225 MHz resonance is low and at the input resistance at the 1575 MHz resonance is high. Connecting plates 325a and 325b from each feed point, respectively, to the bottom of the short-circuited circular waveguide 305 bring these two resonant resistances very close together (to about 80 to 90 Ohms) so that a matching circuit can bring the two input impedances close to 50 Ohms. The input impedance for single layer planar dipole structure is shown on a Smith chart in FIG. 4. The connecting plates (ground return plates) 325a and 325b also form a good ground return path for various types of transmission line 330.

Various circuits and surface mount components that are desirable for performing the various circuit functions needed for low noise signal reception and high purity circular polarization may be mounted on the connecting plates 325a and 325b, as appropriate. The signal outputs from the basic antenna will be taken from the base of the antenna as in other such antennas. The dipoles and planar feed lines such as microstrip line, strip line and coplanar waveguide transmission line structures can be constructed on printed circuit boards in single, double sided and three and more layer configurations. In the configuration of FIG. 3A, the use of a miniature coaxial cables 332 bonded to the connecting plate 325a is possible. In this case, the dual dipoles are fed by the miniature cable running attached, or adjacent to, the connecting plates (or ground return plates). The outer conductor of the coaxial cable is connected continuously or at frequent intervals to the connecting plates 325.

Figure 3B:
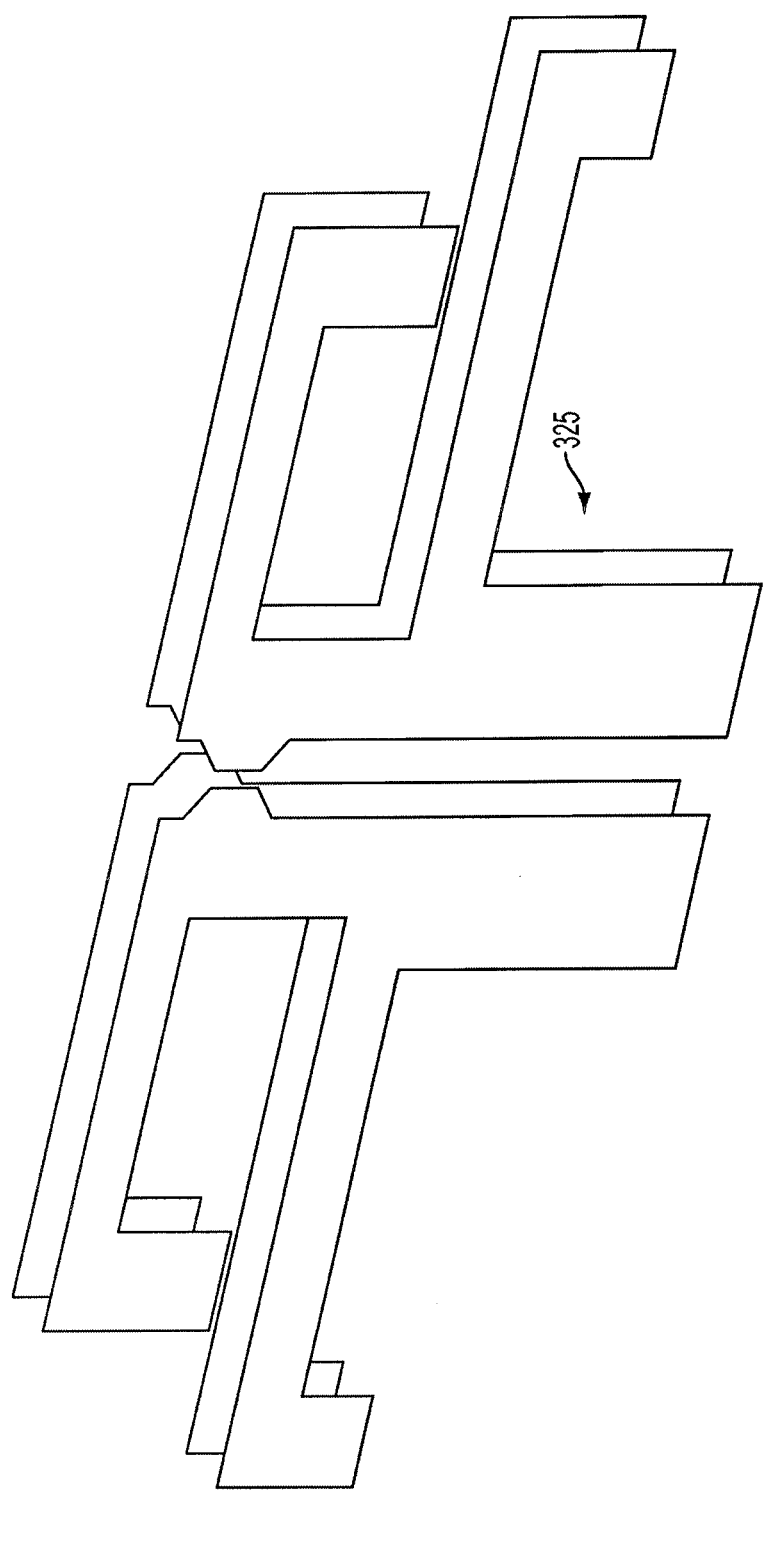
FIG. 3B illustrates how two sets of dual dipoles may be placed for greater symmetry in the waveguide.
Figure 3C:
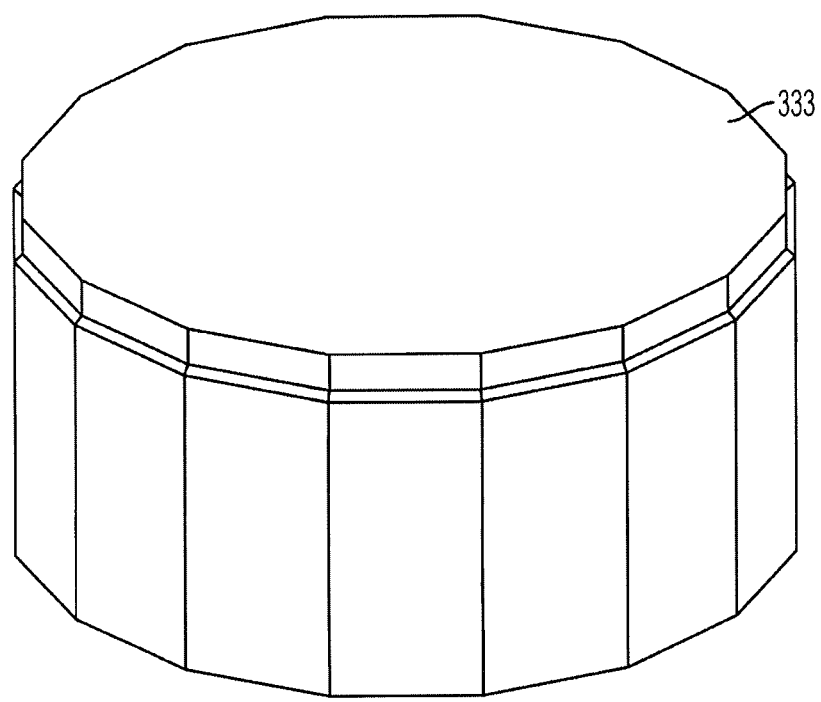
FIG. 3C illustrates a circular waveguide cavity filled with a dielectric.
Figure 3C:
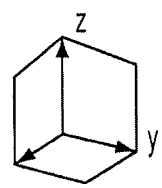
Figure 4:
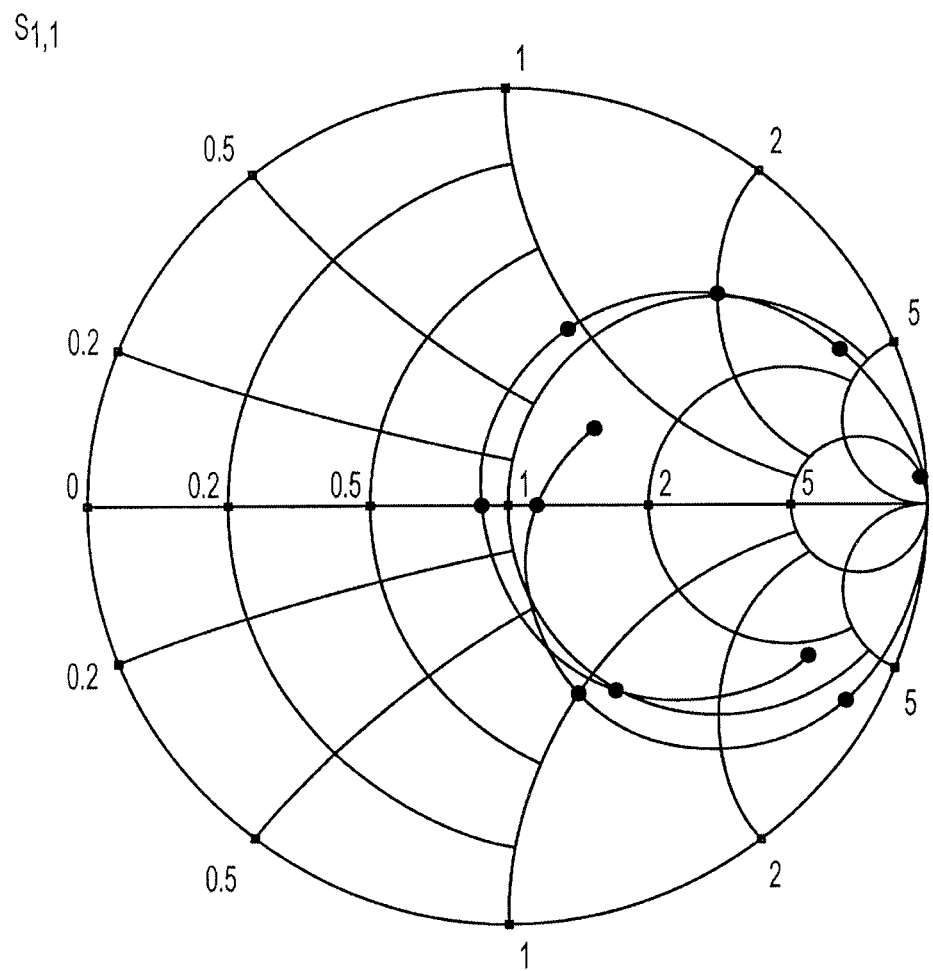
FIG. 4 illustrates the input impedance for single layer planar dipole structure.

FIG. 3B illustrates how two sets of dual dipoles may be placed for greater symmetry in the waveguide. The dipoles are supported and spaced in this arrangement by a dielectric sheet 333 (FIG. 3C). One manner of feeding this structure is a strip line center conductor (not shown) passing between the connecting plates 325 and crossing over to the other half of the dual dipoles.

Figure 2C:
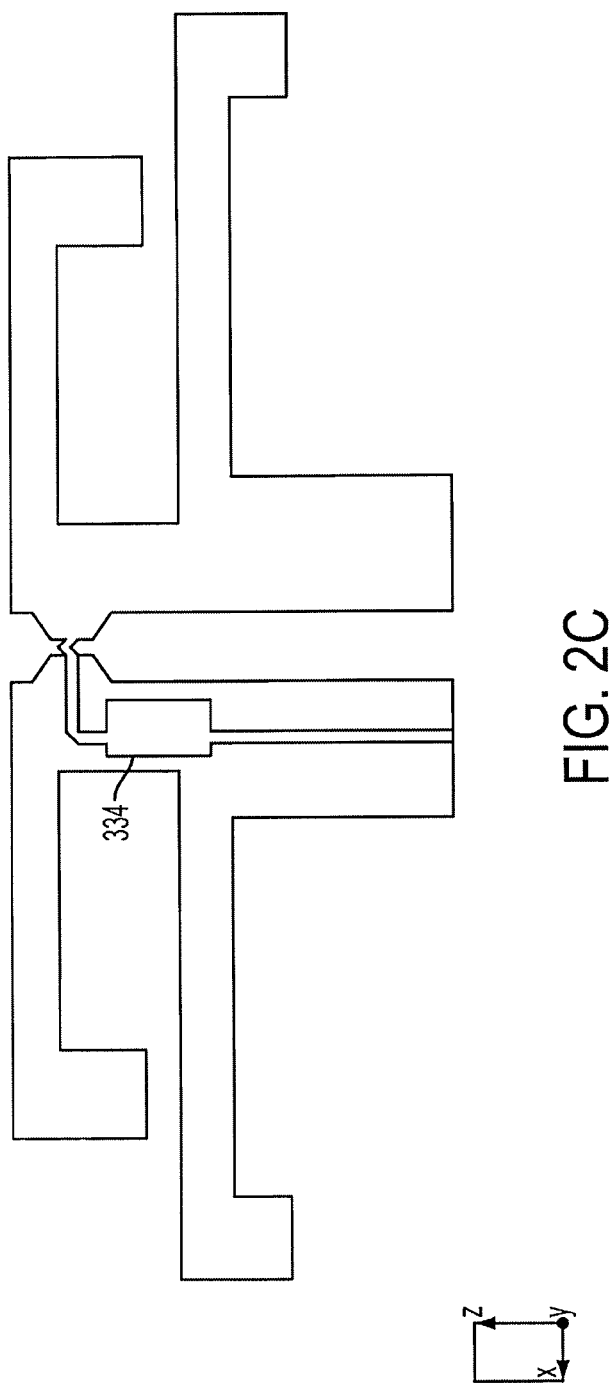
FIG. 2C illustrates a mounting configuration of a circuit component or circuit block to carry out a desirable function (such as amplification, filtering, or matching) close to the dual dipole.

Returning to FIG. 3, the transmission line 330 may run up the connecting plate (e.g., 325a) using the connecting plate (e.g., 325a) as the ground return and then at the feed point, the hot line of the transmission line 335 feeds across to the other connecting plate (e.g., 325b) for a self balancing feed, thereby removing the need for separate balun structures. A crossover structure is needed for the X directed dipoles relative to the Y directed dipoles. The feed for the X directed dipoles will be elevated as shown in FIG. 3 and the feed for the Y directed dipoles will be depressed. If the dual dipoles are built on a printed circuit board (PCB) then complementary slots should be cut into the boards so that they can mesh together as described for example in U.S. Pat. No. 4,686,536. For one embodiment of the invention, the electrical length of the two transmission lines are substantially equal to each other. Referring once again to FIG. 2A, the cylindrical waveguide short 210 can be made with a printed circuit board with various electronic components mounted on it using conventional printed circuit board and surface mount technologies. In FIG. 2C, a possible mounting configuration of a circuit component 334 or circuit block to carry out a desirable function (such as amplification, filtering, or matching) close to the dual dipole is shown. Generally, it is desirable to carry out these types of functions as close to the source as possible since it may be difficult to remove the effects of circuit losses or mismatches in subsequent processing.

Many turnstile antennas use reactive (capacitive and inductive) dipoles in addition to the resistive component to obtain the required 90-degree phase shift between two dipole currents, for example as described in U.S. Pat. Nos. 4,062,019 and 4,109,254. For one embodiment, a GPS antenna implements a quadrature hybrid coupler due to the attendant superior broadband and precise electrical 90-degree phase shift and precise amplitude balance between the X directed and the Y directed dual dipoles. For various alternative embodiments, hybrids can be constructed to have an amplitude balance of about +−0.1 dB or better and a phase differential of 90 degrees and a deviation of less than 1 degree at the two frequency bands. A quadrature hybrid with this performance will provide very high quality circular polarization if it is the only limitation in the antenna. Other 90-degree splitting circuits such as branch line couplers and so on may be used but some sacrifice of wideband performance of HPCP can be expected.

Figure 5A:
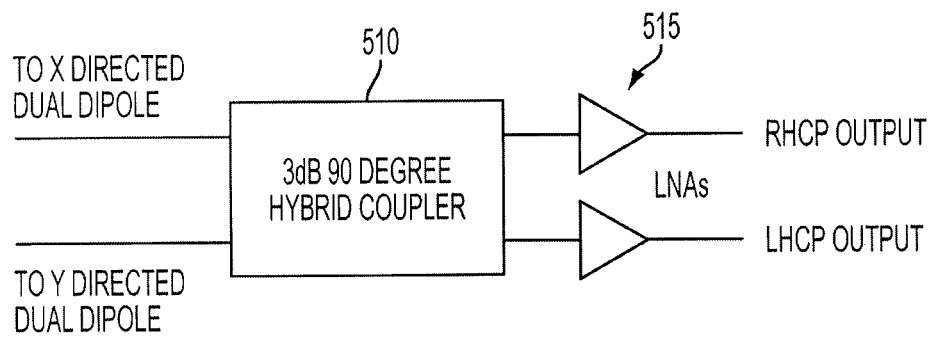
FIGS. 5A and 5B illustrate two alternative example arrangements of the 90-degree hybrid coupler and LNA.
Figure 5B:
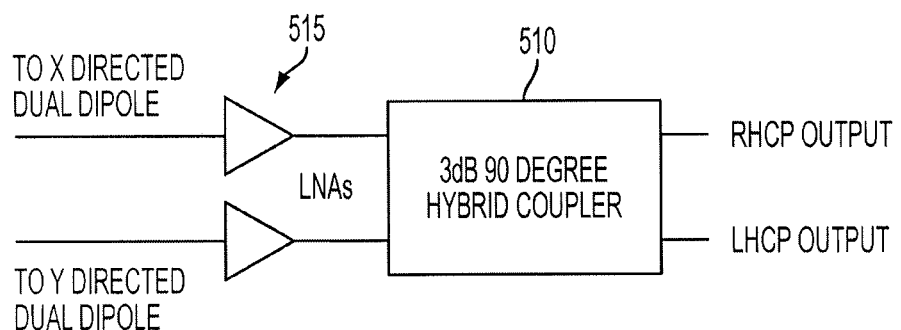

FIGS. 5A and 5B illustrate two alternative example arrangements of the 90-degree hybrid coupler 510 and LNA 515 in accordance with alternative embodiments. If phase and amplitude balance is most important then it may be more appropriate to use the circuit of FIG. 5A. If the LNAs 515 are very well balanced for gain and phase delay and antenna noise must be minimized it is appropriate to mount the LNAs 515 on the grounding strap of each dual dipole and have the hybrid placed on the circular grounding plate. More LNAs may follow the hybrid. Amplifiers following the hybrid coupler 510 also isolate the outputs thereby preventing badly matched receiver input impedances from negatively affecting the signal balances of the dual dipoles.

Figure 6:
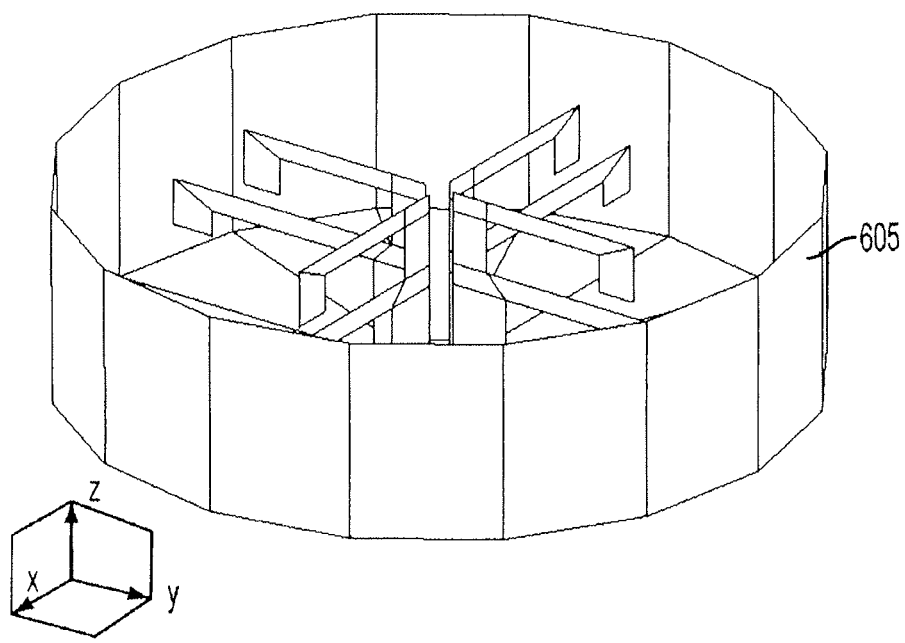
FIG. 6 illustrates an antenna in accordance with one embodiment of the invention.

One embodiment is illustrated in FIG. 6. The numerical Method of Moment simulations can be used to examine the RHCP and LHCP (also called rcp and lcp) that this antenna produces. It has been found that RHCP purity is enhanced if the cylindrical waveguide 605 is made relatively short—that is, about one sixth of a free space wavelength at the lowest center frequency of 1175 MHz. Note that the circular waveguide as described above may be implemented as one of a number polygons, for example as a 16-sided cylinder or a 32-sided cylinder in the EM simulations. The best location of dual dipoles is obtained when to the top of the top dipole is placed flush with the top on the circular waveguide. This vertical position may be varied by about +−0.02 wavelengths without strong effects on the performance of the antenna.

Figure 7A:
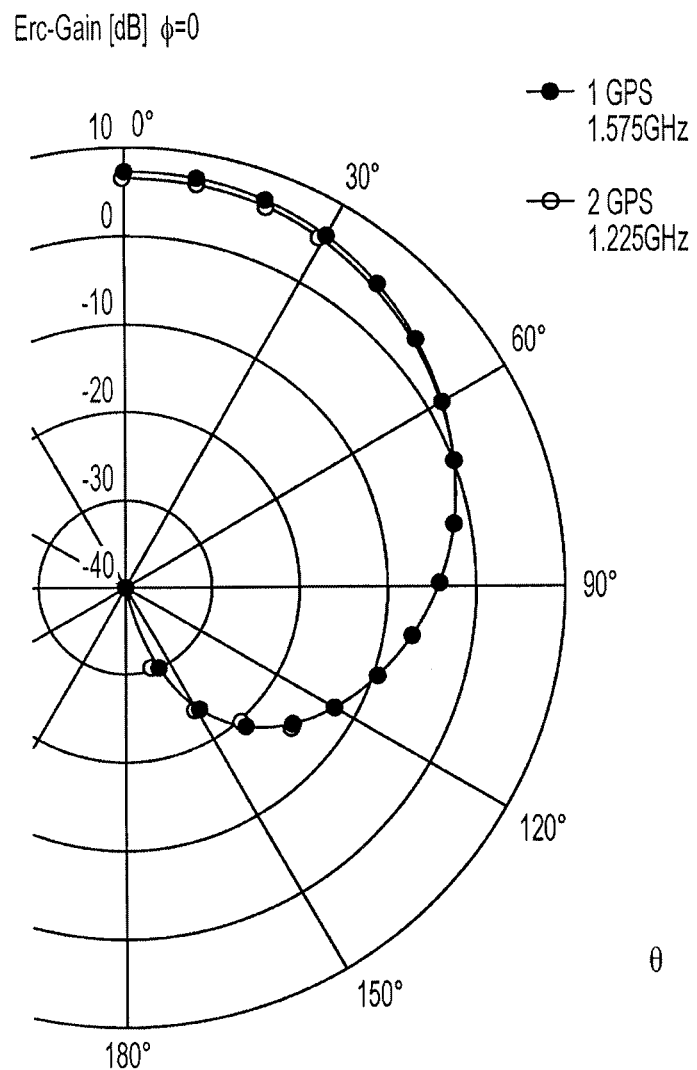
FIGS. 7A and 7B illustrate the RHCP and LHCP responses, respectively, at 1225 and 1575 MHz on a vertical cut through the antenna.
Figure 7B:
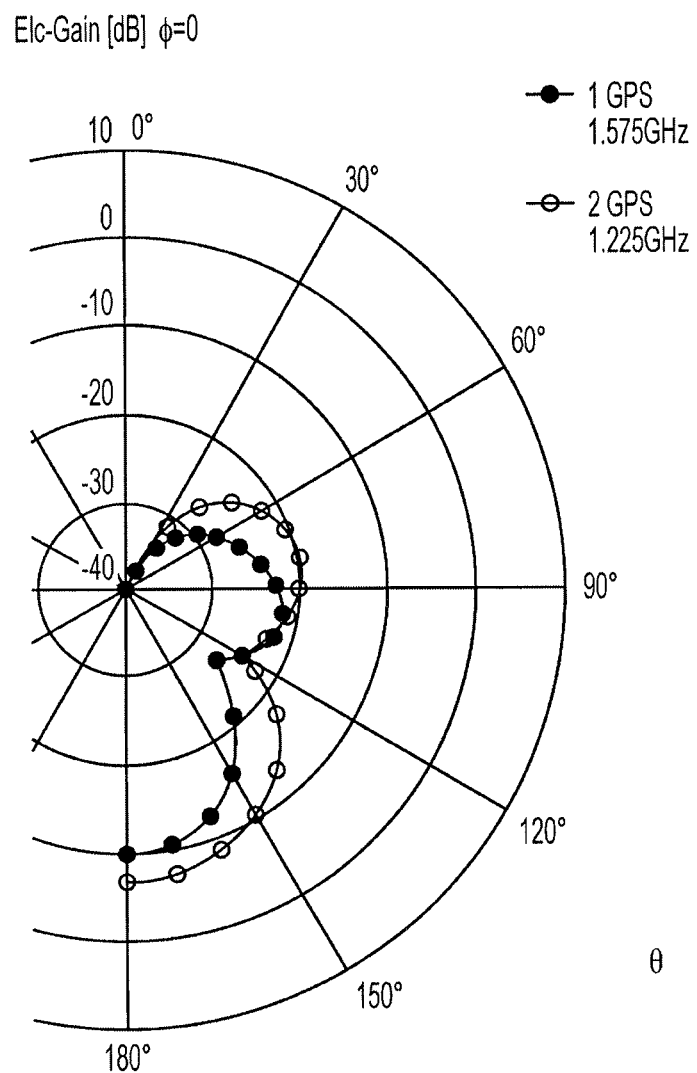

It is useful to examine the radiation received by this antenna in its basic form. FIGS. 7A and 7B illustrate the RHCP and LHCP responses, respectively, at 1225 and 1575 MHz on a vertical cut through the antenna. The responses at 1175, 1205 and 1275 are very similar to the response as shown for 1225 MHz. The radiation responses are essentially independent of the value of the phi. It will be noted that the RHCP is much stronger than the LHCP for all angles above the horizon, generally speaking by more than 20 dB. It will be noted however that the LHCP has maximum pointing straight at the ground. This may not be a desirable response as an RHCP signal can come in from a high elevation, hit the ground, and then be reflected off of the ground and arrive at the antenna as an LHCP signal. To address this situation, embodiments can effect a reduction of the response of the antenna to a "back radiation" signal. One structure used for reducing the response of GPS antennas to ground reflections is a corrugated choke ring with a fairly large diameter (e.g., approximately about 300 to 700 mm). Such a conventional corrugated choke ring of typical construction may detrimentally affect the input impedance of the dipoles and also may have a very strong negative affect on the RHCP to LHCP ratio especially at elevation angles close to the horizon. Embodiments may provide a structure that has significantly reduced affect on the basic behavior of the antenna with regard to the antenna terminal impedances and the RHCP and LHCP ratios in the upper hemisphere.

Reduced Response to Back Radiation

Figure 8:
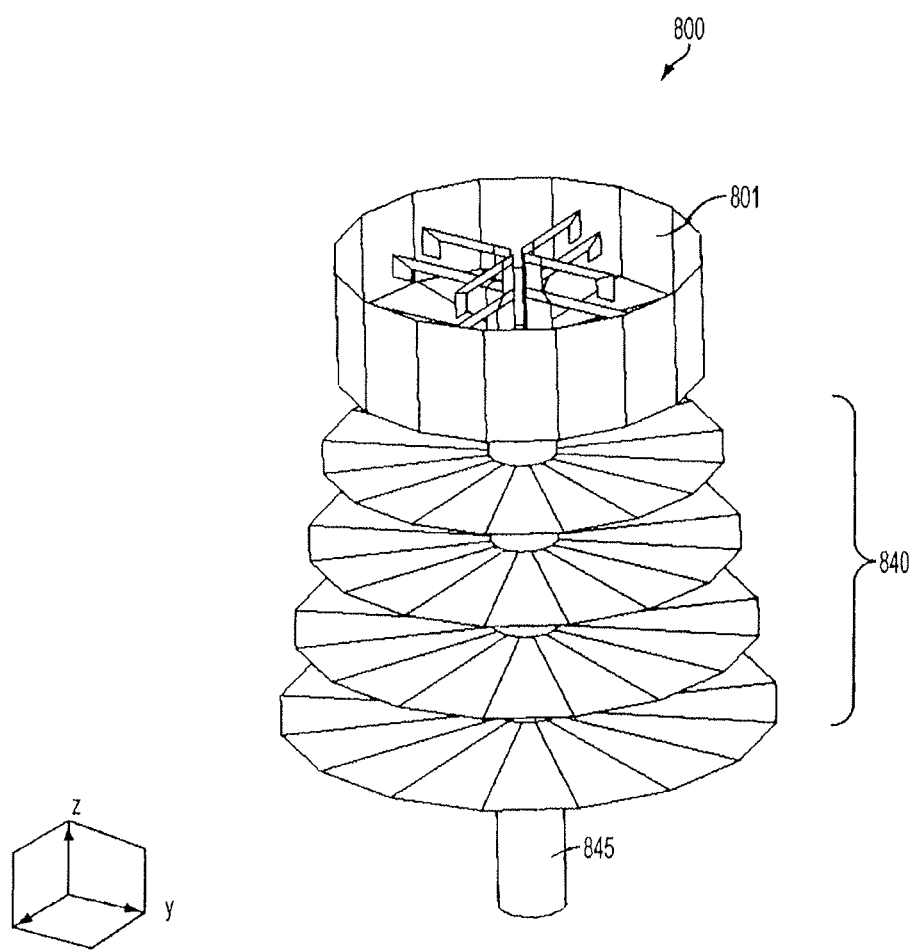
FIG. 8 illustrates an antenna structure for reducing the response of the antenna to a back radiation.
Figure 9:
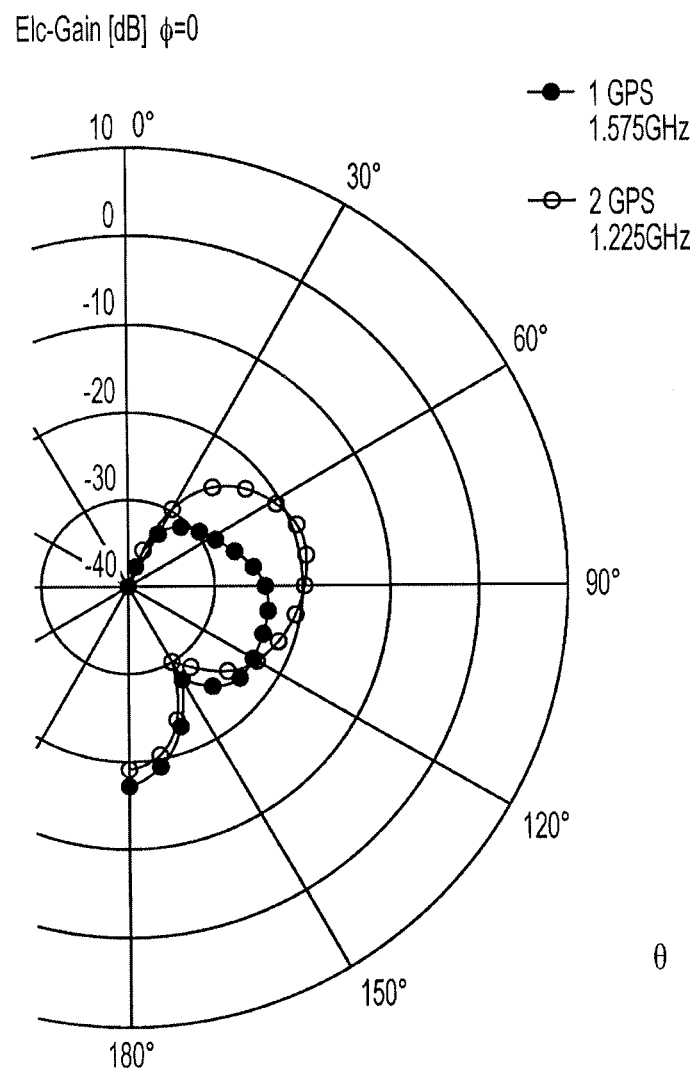
FIG. 9 illustrates the backward radiation suppression effected by the antenna system 800.

FIG. 8 illustrates an antenna structure for reducing the response of the antenna to a back radiation. Such a structure can be used with embodiments as described above, or with various conventional antenna systems. Antenna 800, shown in FIG. 8, includes conducting disks 840, which are spaced from the antenna 801 and from one another by predetermined distances. In alternative embodiments the number of conducting disks 840 may vary. For one embodiment, the conducting disks 840 are supported by a conducting central rod or tube 845 to provide mechanical stability and an antenna mounting structure that is electromagnetically unobtrusive. The tube 845 also provides an interior pathway for signal and power feeds to the antenna 801. It has been found that various disk arrangements are successful in suppressing the response to signals coming from below the antenna. Some arrangements of the disks tend to cause varying vertical position phase centers as the reception elevation angle is changed. For one embodiment, the arrangement shown in FIG. 8 has antenna and disk spacing of 0.183 wavelengths and increasing disk diameters of 0.063 wavelengths using 1575 MHz as the reference frequency. FIG. 9 illustrates the backward radiation suppression effected by the antenna system 800 in accordance with such an embodiment. As shown in FIG. 9, the backward LHCP radiation is reduced by about 15.5 dB for the 1225 MHz band frequencies and about 6.5 dB for 1575 MHz band.

Figure 8A:
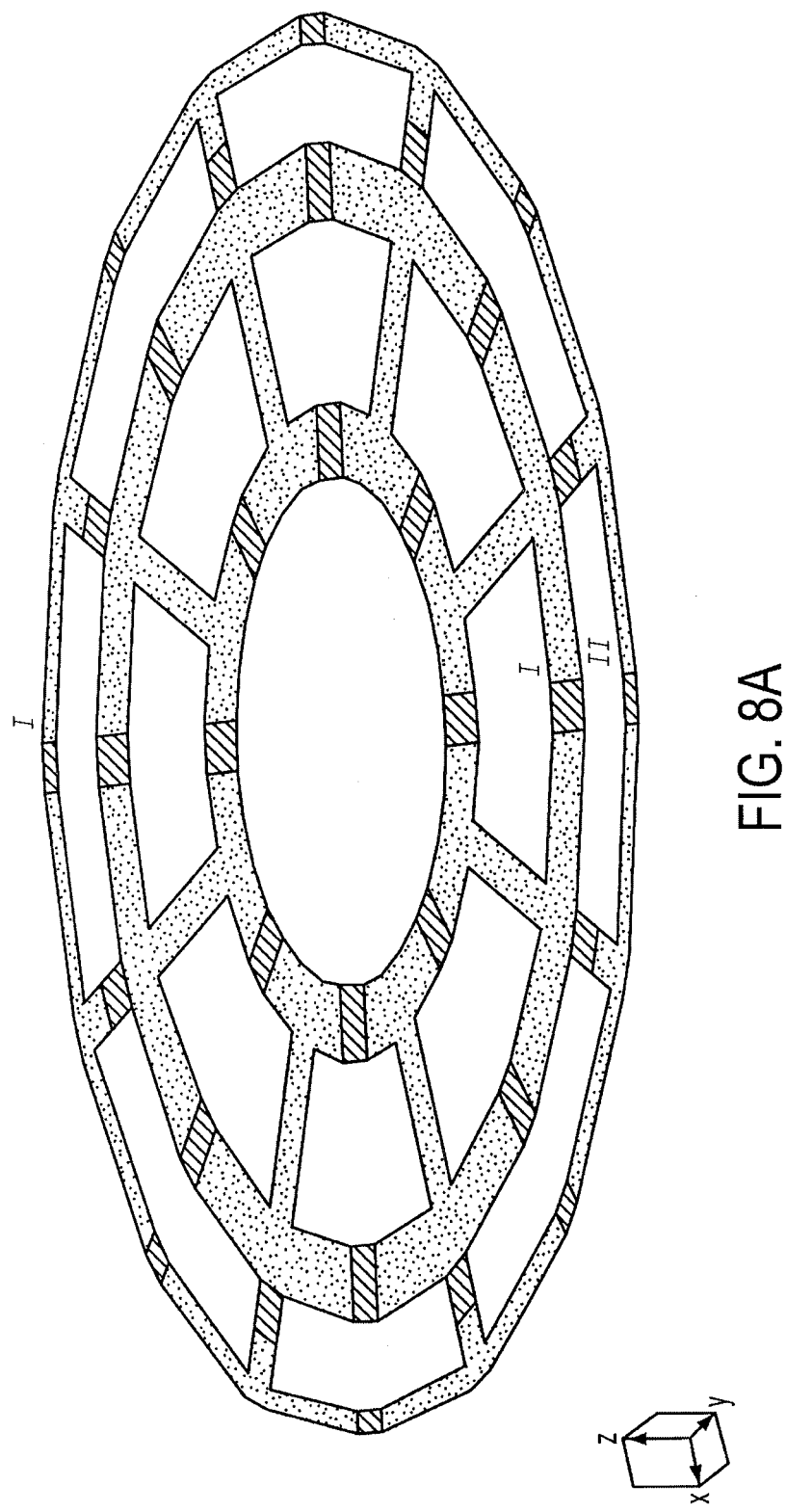
FIG. 8A illustrates the use of a conducting disk for reducing back radiation.

A single conducting disk may be used to reduce the back radiation by a similar amount to the multiple disk arrangement 800 providing that the disk has multiple apertures and radial and circumferential slots cut into it and the slots are bridged by electrical resistive material or by discrete resistors. The disk is circular or approximately circular but is viewed from an oblique angle in FIG. 8A. The dark areas represent the remaining and highly conductive part of the disk and the shaded areas represent the locations of the resistive material. The resistive material or components should have values that are optimized for each location. All resistivities on a given radius must be set to a given value to preserve axial symmetry.

In addition, it is contemplated that the circular waveguide can be constructed with a non-constant radius—as compared to the constant radius of circular waveguides shown in FIGS. 2A (#205) and 8 so that the cylindrical shell becomes a conical shell (not shown). Increasing the radius of the top of the waveguide (upright cone) tends to decrease LCP radiation at the horizon and increase the backward LCP radiation. Increasing the radius of the bottom of the waveguide (inverted cone) decreases the backward radiation but tends to increase the LCP radiation at the horizon.

Figure 10:
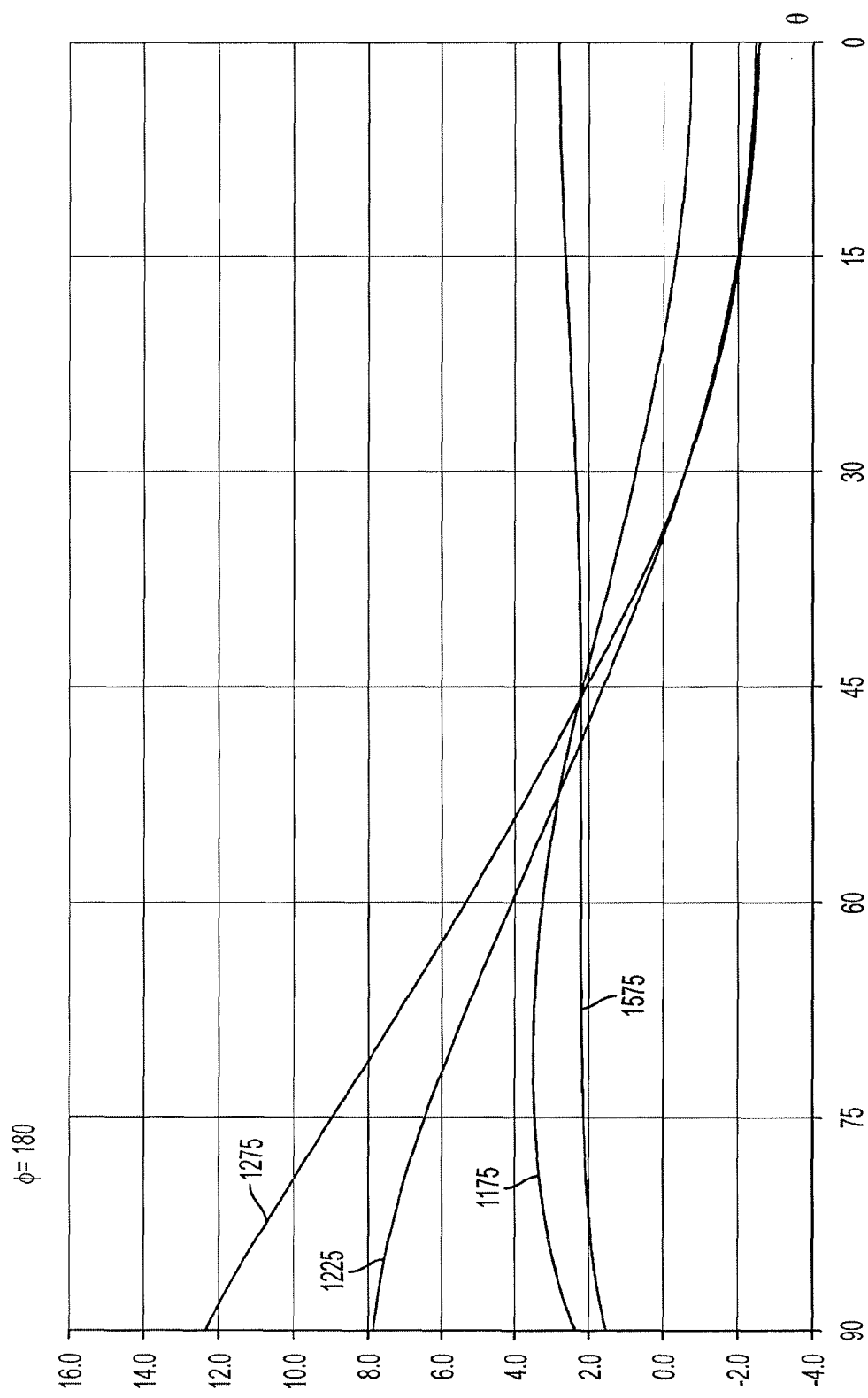
FIG. 10 illustrates the antenna phase behavior as a function of the elevation angle of the incoming wave of the antenna system 800.
Figure 11:
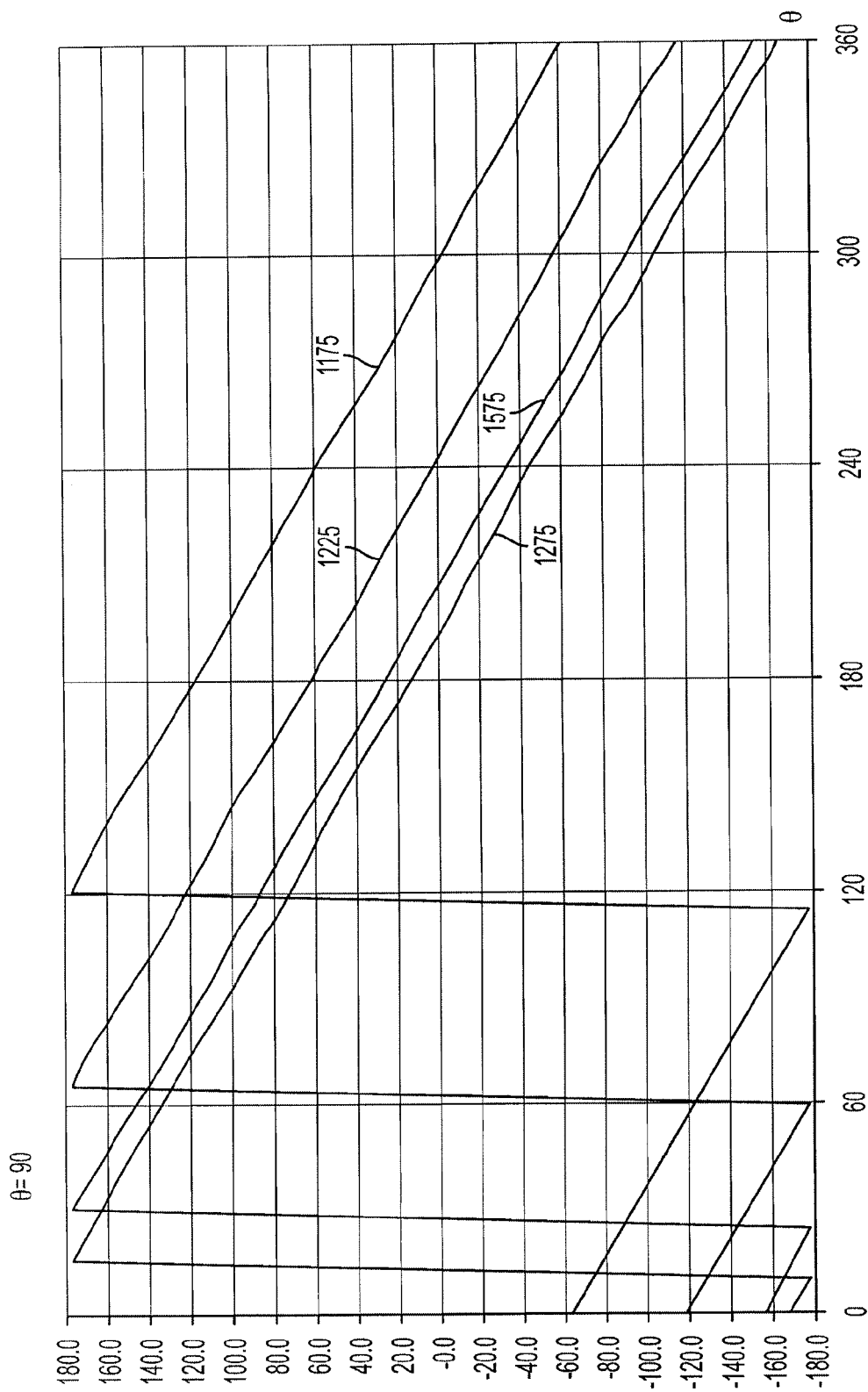
FIG. 11 illustrates the phase of the received signal as a function of the azimuth angle of the incoming EM wave.

FIG. 10 illustrates the antenna phase center position of the antenna system 800. The antenna phase center has good constancy of position as shown in FIG. 10. A cosine shape (upright or inverted) as a function of theta indicates that the reference point on the antenna is displaced from the antenna positional reference point but still indicates a constant phase center. As may be seen from the FIG. the 1225, 1275 and 1575 MHz frequencies have stable phase centers to better than one degree which corresponds to distances of about 0.7 to 0.5 mm for the different frequencies. A cosine shape can be fitted to the 1175 MHz phase response to a worst-case error of about 2 degrees, which corresponds to an error of about 1.5 mm. The phase center lies on the Z-axis of antenna. The phase center has slightly different vertical positions for each frequency. FIG. 11 illustrates the phase of the received signal as a function of the azimuth angle of the incoming EM wave in accordance with one embodiment. As shown in FIG. 11, the electrical angle changes linearly with the physical angle.

It will be clear to a person skilled in the art that the RHCP and LHCP radiation pattern information presented in FIGS. 7A, 7B, 8, 9, and 10 for the RHCP signals will apply to the LHCP signals that come out of the LHCP port of the hybrid. The data presented in FIG. 11 will be similar for LHCP signals, but the slope will be in the opposite direction.

Multipath Determination

The arrangement(s) described herein helps to reduce errors introduced by reflected, refracted, and diffracted signals in addition to the desired direct signal. Substantial rejection of LHCP signals that arrive at the antenna out of the RHCP antenna port is realized. Any signal that has a LHCP component must have undergone in part an interaction with some structure. The LHCP signal therefore will contain corrupted information regarding the distance to the GPS antenna and the satellite. Therefore, a high rejection of LHCP will provide good rejection of erroneous data arriving at the input of the GPS receiver.

Figure 12:
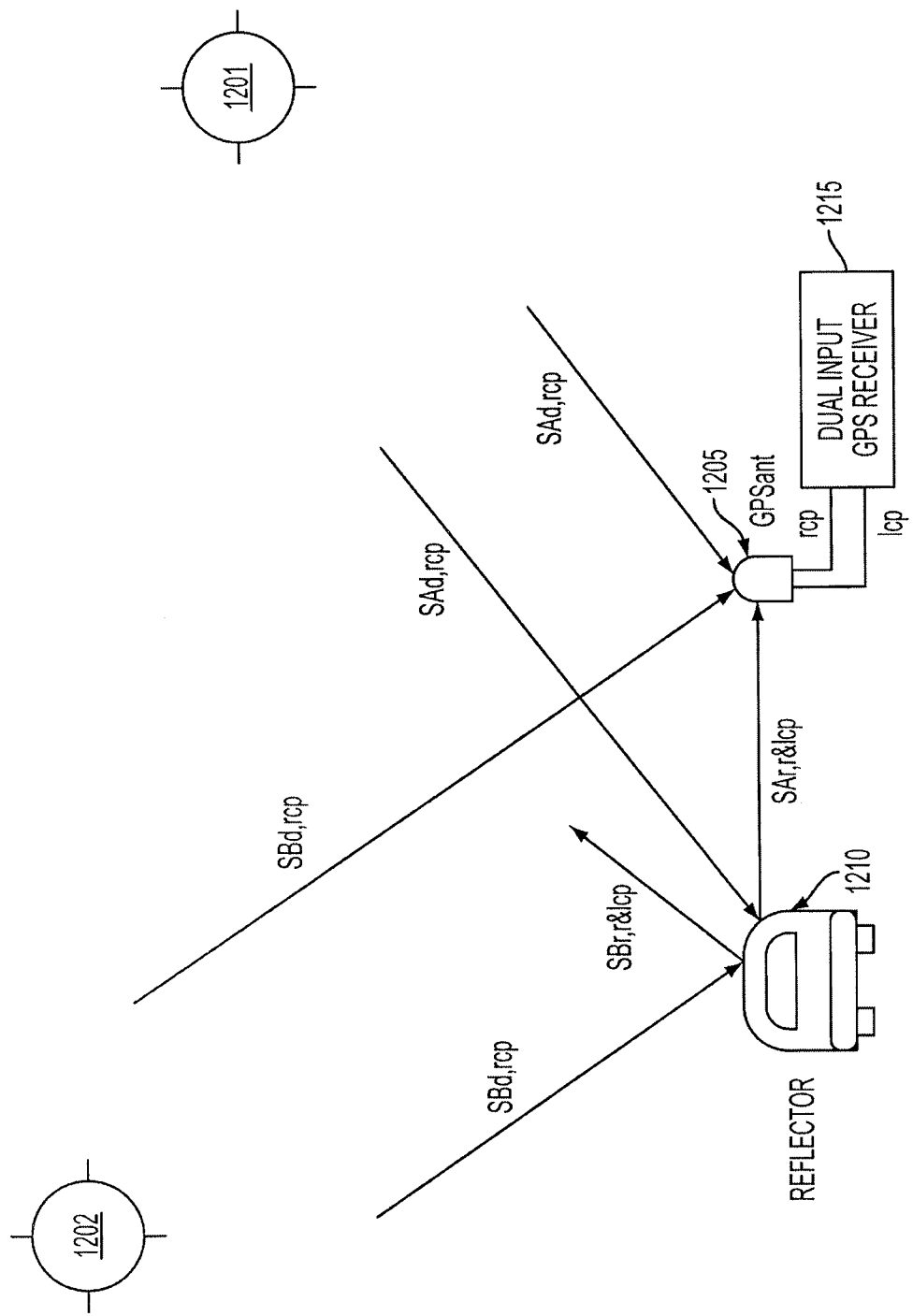
FIG. 12 illustrates a configuration of a satellite-based positioning system signals in the presence of signal multipath.

The arrangement(s) described herein also help to reduce errors introduced by reflected, refracted, and diffracted signals. To this end, a method is provided for determining signal multipath. FIG. 12 illustrates a configuration of a satellite-based positioning system signals in the presence of signal multipath. As shown in FIG. 12, a number of satellites are shown for example as satellites 1201 and 1202. Practically, a GPS system may receive signals from many satellites concurrently, but only two are shown in FIG. 12 for clarity. The signals from the two satellites 1201 and 1202 are designated as SA and SB respectively. Each satellite 1201 and 1202 has a direct RHCP signal path to the GPS antenna 1205. Each of the satellites 1201 and 1202 also has direct signal paths to a reflecting object 1210.

Figure 12A:
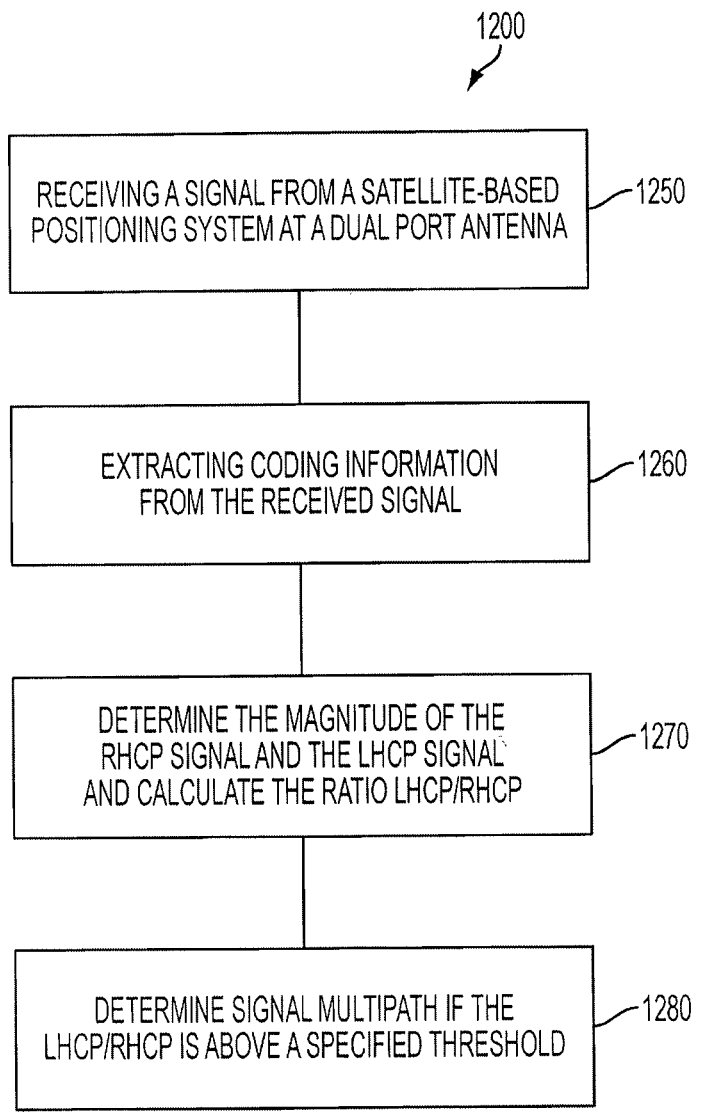
FIG. 12A illustrates a process for determining signal multipath.

As shown in FIG. 12, a satellite signal (e.g., SAr) is reflected towards the GPS antenna 1205. The reflected signal will most probably have a mix of RHCP and LHCP. The result is that the total received signal from satellite 1201 will have a mix of RHCP and LHCP signals out of the antenna while the total received signal from satellite 1202 will have a relatively pure RHCP signal out of the antenna. As the reflected signals must travel a longer path (from satellite 1201) the data obtained from satellite 1201 will have erroneous information for determining the position of the GPS antenna 1205. The GPS receiver 1215 includes a digital processing system (DPS) and associated software, not shown, that provides signal processing capabilities to determine position. Due to the erroneous information received from satellite 1201, less weight should be given to the position information obtained from the signals of satellite 1201 compared with satellite 1202. In general, satellite signals having relatively lower ratios of LHCP over RHCP signals should be weighted more than satellite signals having relatively higher ratios of LHCP over RHCP signals. Thus, embodiments described herein provide an antenna system that can be used to determine the quality of the information received from each satellite as impacted by signals affected by reflection, diffraction and refraction. This allows for increased accuracy of position determination by eliminating or discounting information from satellite signals having multipath during the calculation of the antenna location. FIG. 12A illustrates a process for determining signal multipath. Process 1200 shown in FIG. 12A begins at operation 1250 in which a signal is received by a dual port antenna having a RHCP port and a LHCP port.

At operation 1260, the coding information is extracted from the signal.

At operation 1270, the magnitude of the RHCP signal and the magnitude of the LHCP signal from the RHCP port are determined and a LHCP/RHCP ratio is calculated.

At operation 1280 the LHCP/RHCP is used to estimate level of multipath and weight received signals so as to reduce the influence of signals with larger levels of multipath.

A like operation in which a RHCP/LHCP ratio is determined for the LHCP port is also possible in accordance with alternative embodiments.

As disclosed herein, there is provided an antenna that includes a waveguide having an aperture at a first end and a conducting component at a second end, the conducting component shorting the waveguide and a first set of two orthogonal dipoles, fed in quadrature, the orthogonal dipoles located near the aperture of the waveguide operating close to its dominant mode cut off frequency.

A high performance circularly polarized antenna intended for receiving signals from Global Positioning Satellites is provided. All relevant Global Navigation Satellite System signal frequencies that emanate or will emanate from the United States Global Positioning Satellites, the USSR GLONASS satellites, and the proposed European Galileo and Chinese Compass Satellite Systems are covered. These satellites transmit Right Hand Circularly Polarized signals to the earth, which are received by airborne, sea borne, land mobile and stationary receiving stations for the purpose of determining geographical location. In accordance with one embodiment, an antenna has two outputs, one with high purity RHCP signals and the other with high purity LHCP signals. The high performance is achieved through the use of crossed shortened dipoles with a circular waveguide with one end shorted and the other end open along with back radiation suppression disks.

While discussed generally in the context of antenna systems for satellite-based positioning systems, embodiments described herein are equally applicable to other antenna systems and other applications as will be apparent to those skilled in the art.

In accordance with alternative embodiments, the dual dipole structure can be built on PC boards with microstrip feed lines, which include a quarter wave transmission line impedance matching component. This allows precise and inexpensive fabrication and assembly. For one such embodiment of the invention, the circular waveguide short is built with a two-sided PCB with the hybrid and the LNAs mounted on the lower side of the PC board. A small cylindrical cavity encloses the electronics and feed and power lines come out of the bottom of the antenna.

The processes disclosed herein are described in their most basic form, but operations can be added to or deleted from any of the processes without departing from the scope of the invention.

Figure 12B:
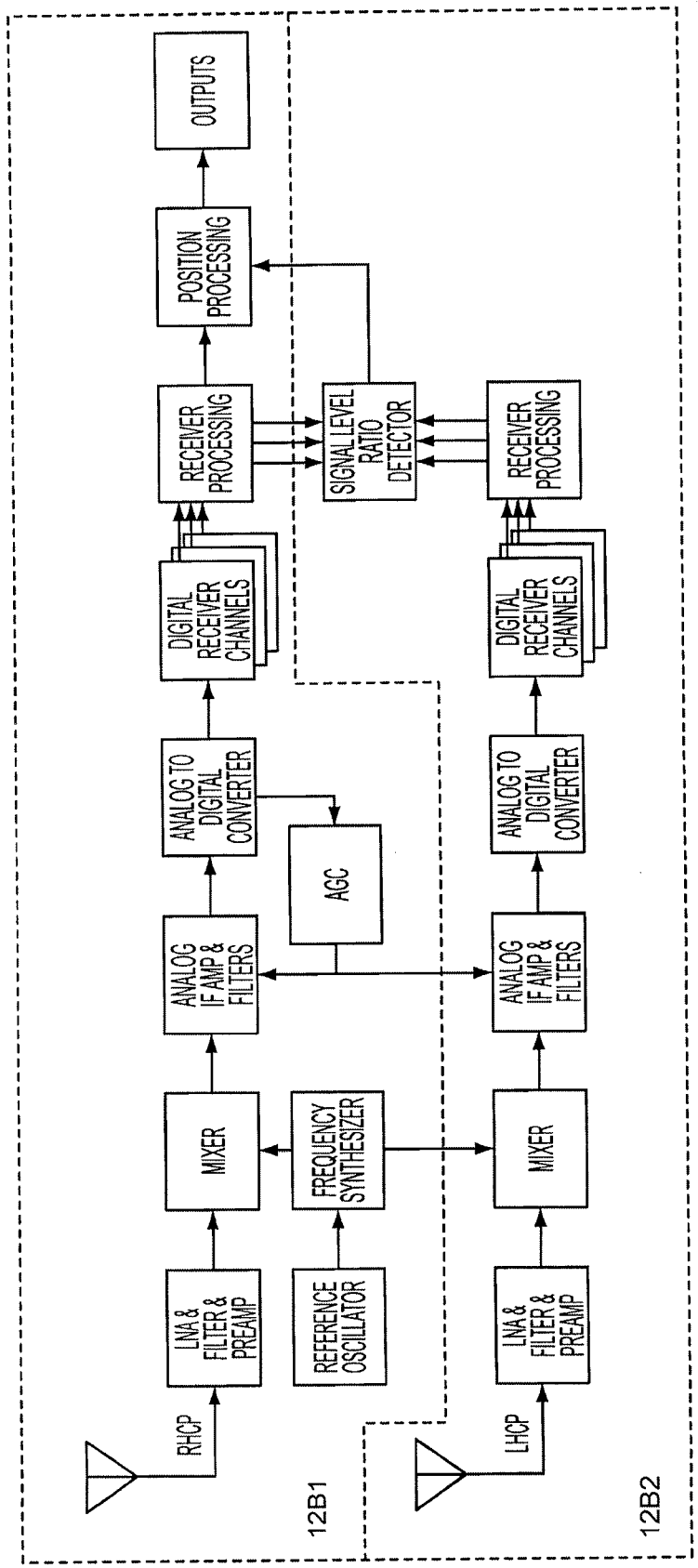
FIG. 12B illustrates a dual input GPS receiver system.

The operations described herein may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central site or, alternatively, one or more operations may be performed elsewhere. FIG. 12B shows a dual input GPS receiver. The group of circuit blocks (12B1) is a generic block diagram of a representative GPS receiver. (Reference "Understanding GPS Principles and Applications", Elliot D Kaplan, Editor, FIG. 5.1, Chapter 5 author Phillip Ward, Artech House 1996, ISBN 0-89006-793-7.) The blocks including the antenna, the LNA, the mixer, the IF Amp, the reference oscillator and the frequency synthesizer are part of the super heterodyne analog receiver architecture. At the output of "Analog IF (intermediate frequency) Amp and Filters" block the signal is conveyed to an "Analog to Digital Converter" block where the analog signal is converted into a digital signal. Then the signal goes to the "Digital Receiver Channels" block which separates the signals from each satellite according to their encoding. The "Digital Receiver Channels" block shows three channels but the actual number could be as large as the number of satellites that are in view. The Digital Receiver Channel blocks (super imposed) along with the "Receiving Processing" block provide Doppler frequency shift accommodation, signal code de-spreading and time shifting, code phase recovery and carrier phase recovery. In addition these blocks have signal amplitude information for each satellite signal. The Receiving Processing block exchanges information with the Position Processing Block to determine the geographical location of the GPS antenna. This information is then conveyed to the user.

The Dual Input GPS receiver uses both sections of the receiver shown in FIG. 12B—that is, 12B1 and 12B2. The additional receiver section may share use of the reference oscillator, the frequency synthesizer and the automatic gain control (AGC) blocks of the single input receiver. The purpose of the second input channel is the determination of the magnitude of the received LHCP signal and comparison of that amplitude with the RHCP signal amplitude for each satellite signal. A Signal Level Ratio Detector Block has been added to the receiver to make this comparison. The output or outputs from this block to the Position Processing Block may be analog or digital signals. An output from Signal Level Ratio Detector Block is conveyed to the Position Processing Block for the purpose of reducing the influence of signals with high levels of multipath on position calculations. In cases where there are good numbers of satellites in view of the antenna and the LHCP signal over the RHCP signal ratio for a particular satellite is insufficiently small, it may be advantageous that the RHCP information for that particular satellite or satellites not be used for the calculation of the position of the satellite antenna. In addition the information provided by the "RHCP over LHCP Comparator" block conveyed to the "Position Processing" block may be used to grade the quality of the RHCP signal coming out of the top "Receiver Processing" block and the numerical weights given to the different satellite signals will depend on the relative RHCP over LHCP ratios of that particular signal. The measurement of LHCP over RHCP will give a statistical measure of the level or extent of multipath. Probably all signals will have at least a tiny amount of multipath. It will be important to reduce the contribution to position calculations of signal that have excessive multipath. The weighting algorithm can be abrupt as in a removal of signals with a LHCP/RHCP magnitude ratio above a certain threshold or it could be a more graduated weighting which would heavily suppress the signals with a relatively strong LHCP and lightly suppress signals with a relatively weak to moderate LHCP levels.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving a signal from a satellite-based positioning system to a Right Hand Circular Polarization (RHCP) port of a dual port antenna, the dual port antenna having a RHCP port for outputting RHCP signals and a Left Hand Circular Polarization (LHCP) port for outputting LHCP signals;
   determining a magnitude of a RHCP component of the signal received from the satellite-based positioning system;
   determining a magnitude of a LHCP component of the signal received from the satellite-based positioning system;
   calculating a ratio of LHCP and RHCP components in response to the magnitude of the RHCP component and the magnitude of the LHCP component; and
   determining an estimate of the level of signal multipath in response to a determination that the ratio is beyond a specified value range.

2. The method of claim 1, wherein the RHCP component of the signal is dominant.

3. The method of claim 2, further comprising suppressing signals having an LHCP component level above a specified threshold value.

4. The method of claim 3, wherein suppressing further comprises assigning a weight value to the signals having the LHCP component level above a specified threshold value, the weight value being selected to mitigate potential impact of multipath on accuracy of Global Positioning Satellite (GPS) calculations.

5. The method of claim 1, wherein the LHCP component of the signal is dominant.

6. The method of claim 5, further comprising suppressing signals having an RHCP component level above a specified threshold value.

7. The method of claim 6, wherein suppressing further comprises assigning a weight value to the signals having the RHCP component level above a specified threshold value, the weight value being selected to mitigate potential impact of multipath on accuracy of Global Positioning Satellite (GPS) calculations.

8. A machine-readable medium that provides executable instructions, which when executed by a processor, cause the processor to perform a method, the method comprising:
   receiving a signal from a satellite-based positioning system to a Right Hand Circular Polarization (RHCP) port of a dual port antenna, the dual port antenna having a RHCP port for outputting RHCP signals and a Left Hand Circular Polarization (LHCP) port for outputting LHCP signals;
   determining a magnitude of a RHCP component of the signal received from the satellite-based positioning system;
   determining a magnitude of a LHCP component of the signal received from the satellite-based positioning system;
   calculating a ratio of LHCP and RHCP components in response to the magnitude of the RHCP component and the magnitude of the LHCP component; and
   determining a signal multipath value in response to a determination that the ratio is outside of a specified value range.

9. A method comprising:
   receiving a signal from a satellite-based positioning system to a Right Hand Circular Polarization (RHCP) port of a dual port antenna, the dual port antenna having a RHCP port for outputting RHCP signals and a Left Hand Circular Polarization (LHCP) port for outputting LHCP signals;

determining a magnitude of a RHCP component of the signal received from the satellite-based positioning system;

determining a magnitude of a LHCP component of the signal received from the satellite-based positioning system;

calculating a ratio of LHCP and RHCP components in response to the magnitude of the RHCP component and the magnitude of the LHCP component; and calculating an estimate of the level of signal multipath.

10. The method of claim 9, wherein the RHCP component of the signal is dominant.

11. The method of claim 10, further comprising suppressing signals having an LHCP component level above a specified threshold value.

12. The method of claim 11, wherein suppressing further comprises assigning a weight value to the signals having the LHCP component level above a specified threshold value, the weight value being selected to mitigate potential impact of multipath on accuracy of Global Positioning Satellite (GPS) calculations.

13. The method of claim 9, wherein the LHCP component of the signal is dominant.

14. The method of claim 13, further comprising suppressing signals having an RHCP component level above a specified threshold value.

15. The method of claim 14, wherein suppressing further comprises assigning a weight value to the signals having the RHCP component level above a specified threshold value, the weight value being selected to mitigate potential impact of multipath on accuracy of Global Positioning Satellite (GPS) calculations.

16. A machine-readable medium that provides executable instructions, which when executed by a processor, cause the processor to perform a method, the method comprising:

receiving a signal from a satellite-based positioning system to a Right Hand Circular Polarization (RHCP) port of a dual port antenna, the dual port antenna having a RHCP port for outputting RHCP signals and a Left Hand Circular Polarization (LHCP) port for outputting LHCP signals;

determining a magnitude of a RHCP component of the signal received from the satellite-based positioning system;

determining a magnitude of a LHCP component of the signal received from the satellite-based positioning system;

calculating a LHCP/RHCP ratio in response to the magnitude of the RHCP component and the magnitude of the LHCP component; and calculating an estimate of the level of signal multipath.

17. The machine-readable medium of claim 16, wherein the method further comprises weighting received signals such that the influence of signals that have an increasing LHCP over RHCP magnitude ratio are increasingly suppressed.

* * * * *